US012616092B2

(12) United States Patent
Pokriefke et al.

(10) Patent No.: US 12,616,092 B2
(45) Date of Patent: May 5, 2026

(54) HARVESTING DEVICE HAVING AN INTEGRATED HYDRAULIC TANK

(71) Applicant: Carl Geringhoff GmbH & Co. KG, Ahlen (DE)

(72) Inventors: Michael Pokriefke, Hude (DE); Steffen Sudhues, Ahlen (DE); Dirk Webermann, Senden (DE); Dominik Sälker, Münster (DE)

(73) Assignee: CARL GERINGHOFF GMBH & CO. KG, Ahlen (DE)

( * ) Notice: Subject to any disclaimer, the term of this patent is extended or adjusted under 35 U.S.C. 154(b) by 64 days.

(21) Appl. No.: 18/677,313

(22) Filed: May 29, 2024

(65) Prior Publication Data

US 2024/0415056 A1      Dec. 19, 2024

(30) Foreign Application Priority Data

Jun. 16, 2023    (DE) .......................... 102023115865.1

(51) Int. Cl.
*A01D 41/127*        (2006.01)
*A01D 89/00*         (2006.01)
*F15B 13/02*         (2006.01)

(52) U.S. Cl.
CPC ....... *A01D 41/1274* (2013.01); *A01D 89/001* (2013.01); *F15B 13/024* (2013.01)

(58) Field of Classification Search
CPC ... F15B 13/024; A01D 69/005; A01D 89/001; F15D 1/0005
See application file for complete search history.

(56) References Cited

U.S. PATENT DOCUMENTS

| | | | | |
|---|---|---|---|---|
| 4,322,086 | A | 3/1982 | Bennink | |
| 4,529,512 | A * | 7/1985 | Williamson | .......... F15B 21/044 |
| | | | | 210/120 |
| 5,165,445 | A * | 11/1992 | Vertanen | ............... F16K 17/196 |
| | | | | 137/493.9 |
| 5,918,760 | A * | 7/1999 | Frodin | ................... B62D 5/062 |
| | | | | 137/574 |
| 7,306,252 | B2 | 12/2007 | Barnett | |
| 8,225,901 | B2 * | 7/2012 | Ohtsuki | ............... F16H 37/043 |
| | | | | 180/312 |
| 2009/0230340 | A1 * | 9/2009 | Purkis | ..................... E21B 34/12 |
| | | | | 251/298 |
| 2023/0092116 | A1 | 3/2023 | Sudhues et al. | |
| 2025/0101996 | A1 * | 3/2025 | Kondo | ..................... F15B 1/265 |

FOREIGN PATENT DOCUMENTS

| | | | | |
|---|---|---|---|---|
| DE | 20309312 | U1 | 11/2003 | |
| DE | 202006020018 | U1 | 8/2007 | |
| EP | 0036197 | * | 9/1981 | ............. A01D 69/03 |
| EP | 0685146 | A1 | 12/1995 | |
| FR | 1423087 | A | 1/1966 | |
| RU | 197300 | U1 | 4/2020 | |

OTHER PUBLICATIONS

Search Report in EP24177394.4, mailed Dec. 20, 2024, 11 pages.

* cited by examiner

*Primary Examiner* — Christian Chace
*Assistant Examiner* — Minato Lee Horner
(74) *Attorney, Agent, or Firm* — Kevin M. Kercher

(57) ABSTRACT

The present invention relates to a storage tank for hydraulic oil, the storage tank being arranged in a hollow frame profile of a frame for a harvesting apparatus.

14 Claims, 3 Drawing Sheets

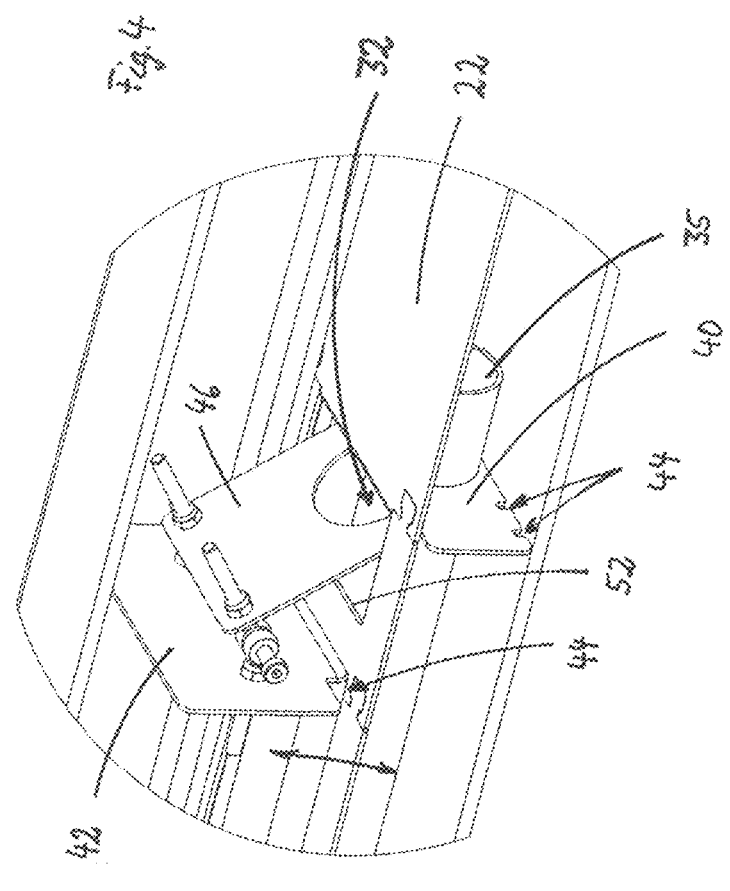
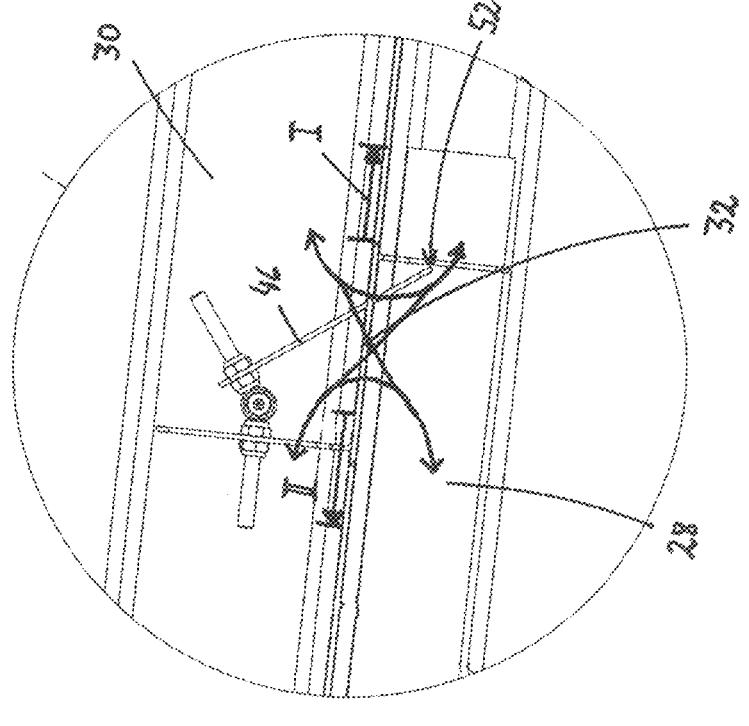

HARVESTING DEVICE HAVING AN INTEGRATED HYDRAULIC TANK

CROSS REFERENCE TO RELATED APPLICATIONS

This application claims priority under 35 U.S.C. § 119 to German Patent Application DE 10 2023 115 865.1, filed Jun. 16, 2023, which is herein incorporated by reference in its entirety, including without limitation, the specification, claims, and abstract, as well as any figures, tables, appendices, or drawings thereof.

FIELD OF THE INVENTION

The present invention relates to a harvesting device having an integrated hydraulic tank.

BACKGROUND OF THE INVENTION

The background description provided herein gives context for the present disclosure. Work of the presently named inventors, as well as aspects of the description that may not otherwise qualify as prior art at the time of filing, are neither expressly nor impliedly admitted as prior art.

Generic harvesting apparatuses such as grain headers, corn headers, pick-up apparatuses, and the like are already known in a wide variety of designs. Such harvesting apparatuses commonly have hydraulic drives for the various machine functions, which hydraulic drives are commonly also activated and deactivated, and set to desired operating parameters, by means of hydraulic valves. The corresponding hydraulics systems may be connected to the hydraulics circuit of the associated agricultural harvester, though they may also have a dedicated hydraulics system. In order to be able to always supply a sufficient quantity of hydraulic oil to the harvesting header under all operating conditions, harvesting apparatuses are increasingly equipped with dedicated tanks for storing sufficient quantities of hydraulic liquid. An example of such a tank is disclosed in the document German Patent Application No. DE 20 2006 020 018 U1. Such tanks are, however, expensive and take up structural space that is commonly not available without accepting functional disadvantages.

For tractors, it is known for frame parts to be designed as hydraulic tanks. For example, German Patent Application No. DE 90 11 297.0 discloses the use of the roll-over bar of a tractor as a hydraulic tank, with the transverse tube serving as an equalizing vessel. Owing to the large structural height of the roll-over bar and the equalization of the liquid levels in the two vertical support tubes via the transverse tube, there is always sufficient hydraulic liquid situated in the support tubes to prevent the oil outlet from running dry.

It is known from the document German Patent Application No. DE 203 09 312 U1 to form the vehicle frame of a lawn tractor from oil-tight hollow profiles that are filled with hydraulic oil and form a storage vessel for the hydraulic oil. The vehicle frame is then extended upwards at least one location in order to form an air cushion for the hydraulic oil. The hydraulic oil quantities required in a lawn tractor are, however, very low. The vehicle frame furthermore has a relatively large structural height, owing to which the quantity fluctuations in the tank and different lateral inclinations of the lawn tractor can be easily compensated without the risk of the oil outlet running dry.

Since harvesting apparatuses are commonly of very flat construction in order to give the drivers of harvesters a clear view of the harvesting operation, the concept of using a frame part of a header as a hydraulic tank appears incongruous.

Thus, there exists a need in the art for a harvesting device having an integrated hydraulic tank.

SUMMARY OF THE INVENTION

The following objects, features, advantages, aspects, and/or embodiments, are not exhaustive and do not limit the overall disclosure. No single embodiment need provide each and every object, feature, or advantage. Any of the objects, features, advantages, aspects, and/or embodiments disclosed herein can be integrated with one another, either in full or in part.

It is a primary object, feature, and/or advantage of the present invention to improve on or overcome the deficiencies in the art.

The present invention relates to a harvesting apparatus having a frame made up of a plurality of structural elements, at least one of which is internally hollow, having units for cutting and/or picking up crops, having units for conveying the cut and/or picked-up crops downstream, having hydraulic components for controlling and/or for driving the aforementioned units, and having a storage tank for storing the liquid required for the operation of the hydraulic components, wherein the storage tank is formed, in the internally hollow structural element of the frame, as a fluid-tight storage tank for storing the liquid required for the operation of the hydraulic components, wherein the cavity formed in the structural element has a feed line connection and a suction connection.

It is the object of the present invention to arrange a tank for hydraulic oil in a harvesting machine, which tank can be implemented inexpensively and takes up little structural space. The tank should furthermore be designed such that the disadvantages described above are avoided.

If the storage tank is formed, in the internally hollow structural element of the frame, as a fluid-tight storage tank for storing the liquid required for the operation of the hydraulic components, the installation of a separate tank can be dispensed with. This reduces the structural complexity of the harvesting apparatus, and no additional structural space is required for a tank. The risk of damage to the tank as a result of collision damage is reduced. Since structural elements of the frame are commonly very robust with relatively large wall thicknesses of the metal profiles used, storing the hydraulic oil in this way also means that the risk of environmental damage being caused by hydraulic oil escaping through leaks in the tank is lower than in the case of conventional tanks with smaller wall thicknesses of the materials used. Where the present description refers only to hydraulic oil for the sake of simplicity, this also refers to all liquids that are used in hydraulics systems for the purposes of transmitting drive power.

In order to connect the storage tank to a hydraulic circuit of a drive hydraulics system, the cavity formed in the structural element must have a feed line connection and a suction connection. The suction connection is preferably connected to a hydraulic pump, which draws the hydraulic oil stored in the structural element out of the cavity formed in the structural element via the suction connection and which, on its pressure side, feeds the hydraulic oil into a hydraulic circuit of a working hydraulics system in order to thus drive working units of the harvesting apparatus. The return line of the hydraulic circuit of the working hydraulics system is connected to the feed line connection of the cavity formed in the structural element. Hydraulic oil that is to be discharged from the hydraulic circuit back into the storage tank can be returned through the feed line connection into the cavity formed, in the structural element, as a storage tank. Aside from the suction connection and the feed line connection that are connected to a hydraulic circuit, the cavity formed in the structural element may additionally have a filling opening and/or an oil drainage opening through which hydraulic oil can be replenished or drained from the cavity formed in the structural element, for example in the event of an oil change.

In one refinement of the invention, the structural element is a transverse profile of an attachment frame. The transverse profile of an attachment frame is particularly suitable as a storage tank for hydraulic oil because it extends over at least a major part of the working width of the harvesting apparatus and has a relatively large profile cross-section owing to the high forces that are transmitted via the attachment frame, and therefore the cavity enclosed by the transverse profile has a relatively large storage capacity. Since the attachment frame is arranged spatially centrally in the harvesting apparatus, this also results in short connection paths for the lines of the working hydraulics system to which hydraulic oil is supplied from the storage tank. The attachment frame is also arranged close to the center of gravity of the harvesting apparatus, resulting in a favorable balance of the machine.

In one refinement of the invention, the storage tank is divided, by a partition that extends in an at least approximately horizontal plane when the harvesting apparatus is in a rest position, into a suction chamber situated below the partition and a storage chamber situated above the partition, and the suction connection opens, via the mouth opening assigned thereto, into the suction chamber. Since a header attached to a harvester is commonly moved over uneven terrain, in particular in such a way that it assumes oblique positions laterally and/or longitudinally with respect to the working direction, resulting in considerable height differences between the heights of the outer edges of the storage tank as viewed over the working width of a header, the frame part in which the suction connection for feeding the stored hydraulic oil to the hydraulics system would repeatedly run dry, owing to surging movements of the hydraulic oil, despite the fact that hydraulic oil is presently required for driving machine components. The intermittent running-dry of the suction connection would lead to interruptions in the drive of the machine components that are driven by means of the working hydraulics system, along with corresponding crop losses. Another problem is bubble and foam formation in the hydraulic oil, which arises, in particular, owing to the surging movements. Air bubbles in the hydraulic liquid reduce the performance of the hydraulic drive.

If the cavity that forms the storage tank is divided by a partition that at least partially extends in an at least approximately horizontal plane when the harvesting apparatus is in a rest position, the partition forms a type of cover for the suction chamber, by means of which surging movements of the hydraulic oil situated in the suction chamber can be at least reduced. Here, the rest position corresponds to an at least approximately horizontal position of the harvesting apparatus. Volume fluctuations that arise in particular as a result of a varying quantity of the hydraulic oil in the storage tank being drawn out of the storage tank into the working hydraulics system by the hydraulic pump can thus be compensated in particular by means of the storage chamber situated on that side of the partition which faces away from the suction chamber, while the fill level of the hydraulic oil in the suction chamber remains at least approximately constant even when a fill level of the hydraulic oil stored in the storage tank is low and even when the harvesting apparatus assumes oblique positions and/or performs pivoting movements. If the suction chamber does not extend over the full width of the storage tank because the partition extends only in certain portions over part of the width of the storage tank, the partition may be angled downwards and thus delimit the suction chamber in a lateral direction. The angled part of the partition then forms a throttle element that throttles the exchange of hydraulic oil between the suction chamber and the storage chamber. The storage chamber part situated on that side of the partition, which faces away from the suction chamber is then at least partially also situated at the level of the suction chamber. If the suction connection opens via the mouth opening into the suction chamber, the hydraulic oil required in the working hydraulics system is drawn out of the suction chamber, and conveyed into the working hydraulics system, only via the mouth opening. If the partition has the effect that certain regions of the suction chamber can scarcely run dry, because the partition at least dampens surging movements in the suction chamber and at least temporarily keeps hydraulic oil in the suction chamber even when the mouth opening of the suction connection is situated above the level of the hydraulic oil in the storage chamber when the harvesting apparatus is in an oblique position about an axis pointing in a working direction, then it is the case under virtually all operating conditions that, at the suction connection that opens into the suction chamber, a quantity of hydraulic oil is available that can cover the present volume requirement for hydraulic oil at the hydraulic pump, without surging movements of the hydraulic oil in the storage tank resulting in interruptions in the volume flow of the hydraulic oil.

The partition between the suction chamber and the storage chamber, and/or that part of the partition which forms a throttle element, is not completely sealed but is provided with one or more suitably dimensioned passage openings that allow relatively small oil quantities to flow from the storage chamber into the suction chamber and vice versa. Pressure and volume equalization between the storage chamber and the suction chamber is possible by virtue of hydraulic oil flowing through the passage openings.

If the hydraulic pump conveys hydraulic oil out of the suction chamber via the mouth opening of the suction connection that opens out in the suction chamber, a replenishing flow of hydraulic oil situated in the storage chamber can pass into the suction chamber through the passage openings which are situated in the partition and/or in the throttle element and which connect the storage chamber to the suction chamber, and the suction chamber thus remains filled up to a high fill level. If the hydraulic pump draws hydraulic oil out of the suction chamber, a replenishing flow of hydraulic oil can pass from the storage chamber into the suction chamber through the passage openings as long as the level of the hydraulic oil in the storage chamber still lies above the passage openings. Even if air is situated in part of the storage chamber, the partition means that the air cannot readily pass into that region of the suction chamber in which the mouth opening of the suction connection is situated.

If the size of the flow transfer opening is limited to a suitable dimension, the flow transfer opening also acts as a type of throttle valve that allows only a limited quantity of hydraulic oil to flow back and forth between the suction chamber and the storage chamber. If the harvesting apparatus is in an oblique position or is being pivoted into an oblique position, or if the harvesting apparatus performs a rocking movement because the harvester is traveling over uneven ground, then for a period of time, only limited quantities of hydraulic oil can flow back and forth between the suction chamber and the storage chamber through the flow transfer opening. The mouth opening of the suction connection is thus prevented from abruptly running dry, even in the event of extreme pivoting and rocking movements. If foamed hydraulic oil or air bubbles are situated in the suction chamber, this or these are separated off under gravitational force, via the flow transfer opening, into the storage chamber, where the foam and the bubbles can disperse before the hydraulic oil is conveyed into the working hydraulics system again.

In this refinement, the feed line connection may open both into the suction chamber and into the storage chamber.

In one refinement of the invention, if the storage tank is divided into thirds in a longitudinal extent direction, the mouth opening of the feed line connection is arranged in the middle third. If the storage tank extends in its longitudinal extent direction transversely with respect to the working direction of the harvesting attachment, this results in the greatest deflections in the vertical direction at the outer ends of the outer thirds of the storage tank. If the mouth opening of the feed line connection is arranged in the middle third, the risk of the mouth opening running dry when the harvesting apparatus performs movements and assumes oblique positions is reduced. If the mouth opening of the feed line connection is situated in the suction chamber, the suction chamber is filled with inflowing hydraulic oil first. When the suction chamber has been filled to such an extent that it can accommodate no further inflowing hydraulic oil, the inflowing hydraulic oil flows through the flow transfer opening into the storage chamber. If the mouth opening of the suction connection is arranged in an outer third of the storage tank and is thus spaced from the mouth opening of the feed line connection, oil foam and bubbles that could be present in the inflowing hydraulic oil can move into the upper region of the suction chamber and from there through the flow transfer opening into the storage chamber, before being drawn with the surrounding hydraulic oil into the mouth opening of the suction connection by the hydraulic pump. This measure, too, reduces the risk of air entering the hydraulic circuit.

In one refinement of the invention, the mouth opening of the feed line connection is arranged in the suction chamber. If the mouth opening of the feed line connection opens into the suction chamber, the hydraulic oil that has been newly introduced into the storage tank is introduced into the suction chamber, in which the mouth opening of the feed line connection is also situated. It is thus ensured that the newly inflowing hydraulic oil is first of all used to fill that part of the suction chamber in which the mouth opening of the suction connection is situated. Once this part of the suction chamber is full, the newly inflowing hydraulic oil can also pass into other parts of the suction chamber and into the storage chamber.

In one refinement of the invention, the mouth opening of the suction connection is situated in the outer third of the length of the storage tank in the longitudinal extent direction. In this refinement, the volume of hydraulic oil that is situated in the middle and opposite thirds of the storage tank can be used as an oil reserve even if the harvesting apparatus is pivoted about an axis pointing in a working direction and is thus not kept horizontal. This is not a problem if the mouth opening of the suction connection is situated at a height below the level of the hydraulic oil in the storage tank. However, even in the reverse situation, if the mouth opening of the suction connection lies above the level of the hydraulic oil in the storage tank, corresponding shielding of the region of the mouth opening of the suction connection makes it possible to prevent the mouth opening of the suction connection from running dry when the harvesting apparatus is in such a pivoted position. The mouth opening of the suction connection may, therefore, even be arranged in the outer region of the length of the storage tank as viewed in the longitudinal extent direction.

In one refinement of the invention, in the storage chamber, there is arranged a throttle element which throttles the exchange of hydraulic oil within the storage chamber and to which there is assigned an adjacent flow transfer opening through which hydraulic oil situated in parts of the storage chamber that are separated from one another by the throttle element can flow when the harvesting apparatus is situated in an oblique pivoted position. The throttle element that divides the interior space of the storage chamber reduces the surging movements of the hydraulic oil when the harvesting apparatus is pivoted transversely with respect to the working direction. Since the surging movements are throttled, the tendency of the hydraulic oil to form foam and air bubbles is reduced. The throttle element reduces the size of the free cross-section of the storage chamber in the region in which the throttle element is arranged. The hydraulic oil can then flow through the flow transfer opening arranged adjacent to the throttle element, but in a smaller quantity than would be the case if the throttle element were not present.

In one refinement of the invention, the mouth opening of the suction connection is arranged so as to be laterally offset with respect to the flow transfer opening in a first direction with respect to the longitudinal extent direction of the storage tank, a first throttle element is arranged in the suction chamber between the mouth opening of the suction connection and the flow transfer opening and separates the suction chamber from the storage chamber, and a second throttle element is arranged in the storage chamber so as to be laterally offset with respect to the flow transfer opening in a second direction with respect to the longitudinal extent direction of the storage tank. The harvesting apparatus can be held in a horizontal position in a direction transversely with respect to the working direction and can be held in an oblique position with respect to the horizontal so as to be at an angle with respect to the horizontal. If the harvesting apparatus is held in an oblique position with respect to the horizontal, a gravity-driven equalization of the distribution of the hydraulic oil within the storage chamber, and between the suction chamber and the storage chamber, occurs in the region of the flow transfer opening. Since oil foam and air bubbles form in this region owing to turbulent flows and can pass from one chamber into the other, there is thus the risk of oil foam and air bubbles entering the region of the mouth opening of the suction connection and being drawn from there into the working hydraulics system if the mouth opening of the suction connection is situated in this region. It is, therefore, advantageous to arrange the mouth opening of the suction connection so as to be laterally offset with respect to the flow transfer opening, and thus remote from the flow transfer opening, where the turbulent flows occur. Depending on the direction in which the mouth opening of the suction connection is offset in relation to the flow transfer opening, and on the direction of rotation in which the harvesting attachment has been pivoted about an axis pointing in a working direction and held, this may however be disadvantageous with regard to the aim of maintaining a quantity of hydraulic oil in the suction chamber in the region of the mouth opening, such that the mouth does not run dry, even in this pivoted position. If the mouth opening of the suction connection is arranged offset with respect to the flow transfer opening in a first lateral direction and the harvesting apparatus is held in a pivoted position which is such that the outer end of the harvesting apparatus in the first lateral direction is raised in relation to the horizontal, the hydraulic oil situated in the suction chamber in the first direction as viewed from the flow transfer opening would run into that part of the suction chamber which is situated in the second direction as viewed from the flow transfer opening, if the cavity has not yet been completely filled with hydraulic oil there.

Furthermore, in this pivoted position, hydraulic oil situated in the suction chamber would flow into the storage chamber and, within the storage chamber, through the flow transfer opening between the parts that are separated from one another by the second throttle element, specifically primarily into that part which is also situated in the second direction as viewed from the flow transfer opening. These flow movements can quickly result in hydraulic oil flowing from that part of the suction chamber, which extends in the first direction into those parts of the suction chamber and of the storage chamber, which extend in the second direction in such a quantity that the mouth opening would consequently run dry, and the hydraulic pump would consequently draw in air or oil foam from the suction chamber. In order to avoid such an effect, in particular an overly rapid loss of hydraulic oil in that part of the suction chamber which is held at a greater height and in which the mouth opening of the suction connection is situated, it is proposed that a first throttle element be arranged in the suction chamber between the mouth opening of the suction connection, the mouth opening being arranged in a first direction as viewed from the flow transfer opening, and that a second throttle element be arranged in the storage chamber so as to be laterally offset with respect to the flow transfer opening in a second direction with respect to the longitudinal extent direction of the storage tank and as viewed from the flow transfer opening.

Here, the first throttle element has the task, when the harvesting apparatus is held in a pivoted position in which the outer end of the harvesting apparatus, which is situated in the first direction is raised in relation to the horizontal, for at least slowing the outflow of hydraulic oil from that part of the suction chamber which extends in the first direction. The first throttle element may, for example, be designed as a simple sheet-metal plate, which at least regionally blocks the free cross section of the suction chamber and the peripheral edge of which at least regionally leaves throughflow slots open in relation to the adjacent inner surfaces of the structural element and/or has the passage openings. Since, in such a refinement of the throttle element, the free cross section of the suction chamber is reduced to the narrow slots between the peripheral edge of the throttle element and the inner surface of the structural element, and/or to the passage openings, the throughput of hydraulic oil that is theoretically possible in the case of a free cross section when the harvesting apparatus is situated in oblique positions is considerably reduced by the throttle element. Thus, in a time interval, only a relatively small quantity of hydraulic oil can flow out of the suction chamber part situated on that side of the first throttle element, which is remote from the flow transfer opening. In particular, even if the harvesting apparatus is in an extensively pivoted position, initially, no air can enter the part of the suction chamber because the part of the suction chamber is shielded by the partition, the flow transfer opening, and the first and second throttle elements against an otherwise possible ingress of air, bubbles and oil foam. If the harvesting apparatus is held in a pivoted position in which the outer end of the harvesting apparatus, which is situated in the first direction, has been lowered in relation to the horizontal, the first throttle element prevents oil foam and air bubbles from entering the region of the mouth opening and being able to flow from there into the working hydraulics system.

The second throttle element has the task, when the harvesting apparatus is held in a pivoted position in which the outer end of the harvesting apparatus, which is situated in the first direction is raised in relation to the horizontal, for at least slowing the outflow of hydraulic oil from the suction chamber into the storage chamber. Thus, in this pivoted position of the harvesting apparatus, that part of the suction chamber, which extends in the second direction, is filled first with hydraulic oil that flows out of the first part of the suction chamber, before the fill level in the storage chamber is also increased using this hydraulic oil. Hydraulic oil situated in a part of the storage chamber that is separated off by the second throttle element is also initially at least partially retained by the second throttle element and diverted through the flow transfer opening into the other part of the storage chamber, from where the hydraulic oil can, owing to the relatively low flow speed, flow at least inter alia into the suction chamber. Thus, by means of the second throttle element, the hydraulic oil is situated from that part of the storage chamber, which extends in the first direction and is initially used to fill the suction chamber, before the hydraulic oil can flow into that part of the storage chamber which extends in the second direction. The fill level of hydraulic oil in the suction chamber is thus kept as high as possible. If the harvesting apparatus is held in a pivoted position in which the outer end of the harvesting apparatus in the first direction is lowered in relation to the horizontal, the second throttle element slows the outflow of hydraulic oil out of that part of the storage chamber which extends in the second direction of the storage chamber. The turbulent flows in the region of the flow transfer opening are thus reduced, and, in this pivoted position of the harvesting apparatus, primarily hydraulic oil from that part of the suction chamber, which extends in the second direction, can flow into that part of the suction chamber which extends in the first direction. The first and second throttle elements thus ensure that that part of the suction chamber in which the mouth opening of the suction connection is situated is adequately filled, in a manner that is less dependent on the present pivoted position of the harvesting apparatus.

In one refinement of the invention, the first and/or second throttle element has one or more passage openings in the lower region. The passage openings arranged and formed in the lower region serve for allowing an, as far as possible, bubble-free fraction of the hydraulic oil that is present at the throttle element to pass through the throttle element, while hydraulic oil, which is not free from bubbles, or which is foamy, is retained by the upper, closed portion of the throttle elements. A passage opening may consist of one or more holes, one or more indentations, and/or one or more recesses, which are situated in the material of the throttle element, and which are entirely or partially bordered by the material of the throttle element. In the presence of a normal operational fill level of hydraulic oil in the storage tank, the passage openings are situated below the surface of the hydraulic oil in the storage tank, such that bubble-free oil can flow back and forth through the passage openings, while oil containing bubbles and foam tends to be situated in the region of the surface of the hydraulic oil, and is skimmed off owing to the absence of passage openings there. The separating effect between hydraulic oil containing foam and bubbles is, however, obtained not only when the harvesting apparatus is in a horizontal position but specifically even when the harvesting apparatus is held in a position in which it has been rotated about an axis pointing in a working direction, or when the harvesting apparatus is being rotated, and hydraulic oil thus flows from one region of the storage tank into other regions.

In one refinement of the invention, in the region of the flow transfer opening, there is arranged a pivotably mounted throttle flap, which extends through the flow transfer opening, and which is held so as to be movable by the hydraulic oil that flows through the flow transfer opening. The throttle flap has the task of throttling the throughflow speed of the hydraulic oil that flows through the flow transfer opening. By virtue of the throttle flap extending through the flow transfer opening, the hydraulic oil is forced, in regions, to flow laterally around the throttle flap. This gives rise to a flow resistance, which reduces the flow speed. The movable throttle flap may, in particular, be used in addition to the throttle elements arranged in the suction chamber and in the storage chamber, in order to influence the flow in the region of the flow transfer opening such that it takes a direction that is advantageous based on the flow direction. Since the throttle flap is moved by the hydraulic oil that flows through the flow transfer opening, it pivots in the flow direction of the hydraulic oil. A more or less pronounced inhibiting action on the oil flow is achieved depending on the shaping of the throttle flap, the direction in which the hydraulic oil flows, and the manner in which the throttle flap is arranged in the region of the flow transfer opening. The throttle flap is advantageously arranged so as to prioritize an inflow of the hydraulic oil into that region of the suction chamber in which the mouth opening of the suction connection is situated. Since the throttle flap extends through the flow transfer opening and thus slows the passage of the hydraulic oil through the flow transfer opening, the turbulent flows in the stored hydraulic oil, which give rise to gas bubbles and oil foam, are reduced in this region. This reduces the risk of air entering the region of the mouth opening of the suction connection.

In one refinement of the invention, the pivotability of the throttle flap is limited to at least one pivoting direction by a stop. If the throttle flap is pushed against the stop by the flow movement of the hydraulic oil, the throttle flap in this position forms a flow resistance that limits the throughflow rate of the hydraulic oil. In the region of the throttle flap, when the throttle flap is in a position in which it is fixed against the stop, a back pressure can build up owing to the hydraulic oil that is present at the throttle flap, which back pressure causes the hydraulic oil to be diverted and forced into that part of the suction chamber in which the mouth opening of the suction connection is situated. Hydraulic oil situated in that part of the suction chamber in which the mouth opening is formed can furthermore be prevented, by the throttle flap held blocked against the stop, from draining into that part of the suction chamber, which is remote from the mouth opening, and/or into the storage chamber. In particular, if the stop is positioned so as to block a pivoting movement of the throttle flap away from the mouth opening of the suction connection, the throttle flap can, in this case, assist in keeping the hydraulic oil in the region of the mouth opening of the suction connection even if the harvesting apparatus is in an unfavorable pivoted position. A simple design is obtained if an edge of the flow transfer opening is provided as a stop. The throttle flap may be pivotally connected to a throttle element by means of a pivot spindle.

In one refinement of the invention, the movable throttle flap throttles the hydraulic oil in both possible flow directions. Since foam and bubbles can form in the hydraulic oil in the region of the flow transfer opening irrespective of the flow direction, it is advantageous if the throttle flap also throttles the flow of the hydraulic oil in both flow directions.

In one refinement of the invention, the storage tank is connected to a snifter valve that allows air to flow into the storage tank if the pressure prevailing in the storage tank undershoots a threshold value. The storage tank may alternatively or additionally be connected to a ventilation valve that opens if the pressure prevailing in the storage tank overshoots a threshold value. By means of the snifter valve and/or the ventilation valve, the storage tank can, within the threshold values and depending on the design of the snifter valves, be operated in a pressurized or unpressurized state, such that no continuous air exchange with ambient air takes place, and therefore no dirt is introduced into the tank. In the case of operation in a pressurized state, oil is prevented from being able to escape through the ventilation valve into the environment, in particular, if, inside the tank, the ventilation valve is covered by oil as a result of the harvesting attachment being in an oblique position.

In one refinement of the invention, the structural element of the frame has, over its extent in the longitudinal extent direction of the fluid-tight storage tank, two C-shaped profiles, which delimit the storage tank in the longitudinal extent direction and which, arranged with their open longitudinal sides facing towards one another, are welded together in the region of abutment over their length, wherein the partition is placed between, and welded to, the limbs of the mutually facing C-shaped profiles. With the C-shaped profiles, a corresponding structural element having a partition arranged in the internal cavity can be produced easily and inexpensively, wherein the structural element exhibits sufficient strength to absorb and dissipate the forces that act on the frame of the harvesting apparatus.

In one refinement of the invention, the harvesting apparatus is a multi-part machine having at least one central frame and having two attachment frames arranged laterally with respect to and pivotably connected to the central frame, wherein the structural element is the central transverse profile of the central frame. In the case of multi-part harvesting apparatuses, the transverse profile of the central frame is particularly suitable, from a balance and structural space aspect, for being used as a storage tank.

It is expressly pointed out that the subject matter of an independent claim on its own, or in any combination of several dependent claims with one another, may be combined with the features of the dependent claims, provided that there are no technical barriers that oppose such a combination.

Further modifications and refinements of the invention can be found in the following description of the subject matter, in the drawings, and in the claims.

These and/or other objects, features, advantages, aspects, and/or embodiments will become apparent to those skilled in the art after reviewing the following brief and detailed descriptions of the drawings. Furthermore, the present disclosure encompasses aspects and/or embodiments not expressly disclosed but which can be understood from a reading of the present disclosure, including at least: (a) combinations of disclosed aspects and/or embodiments and/or (b) reasonable modifications not shown or described.

BRIEF DESCRIPTION OF THE DRAWINGS

Several embodiments in which the present invention can be practiced are illustrated and described in detail, wherein like reference characters represent like components throughout the several views. The drawings are presented for exemplary purposes and may not be to scale unless otherwise indicated.

The invention is described below on the basis of the figures. The figures are only exemplary and do not restrict the general concept of the invention. In the figures:

FIG. 3 shows an enlarged view of the region marked in FIG. 2; and

FIG. 4 shows a perspective illustration of the region illustrated in FIG. 3.

An artisan of ordinary skill in the art need not view, within isolated figure(s), the near infinite number of distinct permutations of features described in the following detailed description to facilitate an understanding of the present invention.

DETAILED DESCRIPTION OF THE INVENTION

The present disclosure is not to be limited to that described herein. Mechanical, electrical, chemical, procedural, and/or other changes can be made without departing from the spirit and scope of the present invention. No features shown or described are essential to permit basic operation of the present invention unless otherwise indicated.

Figure 1:
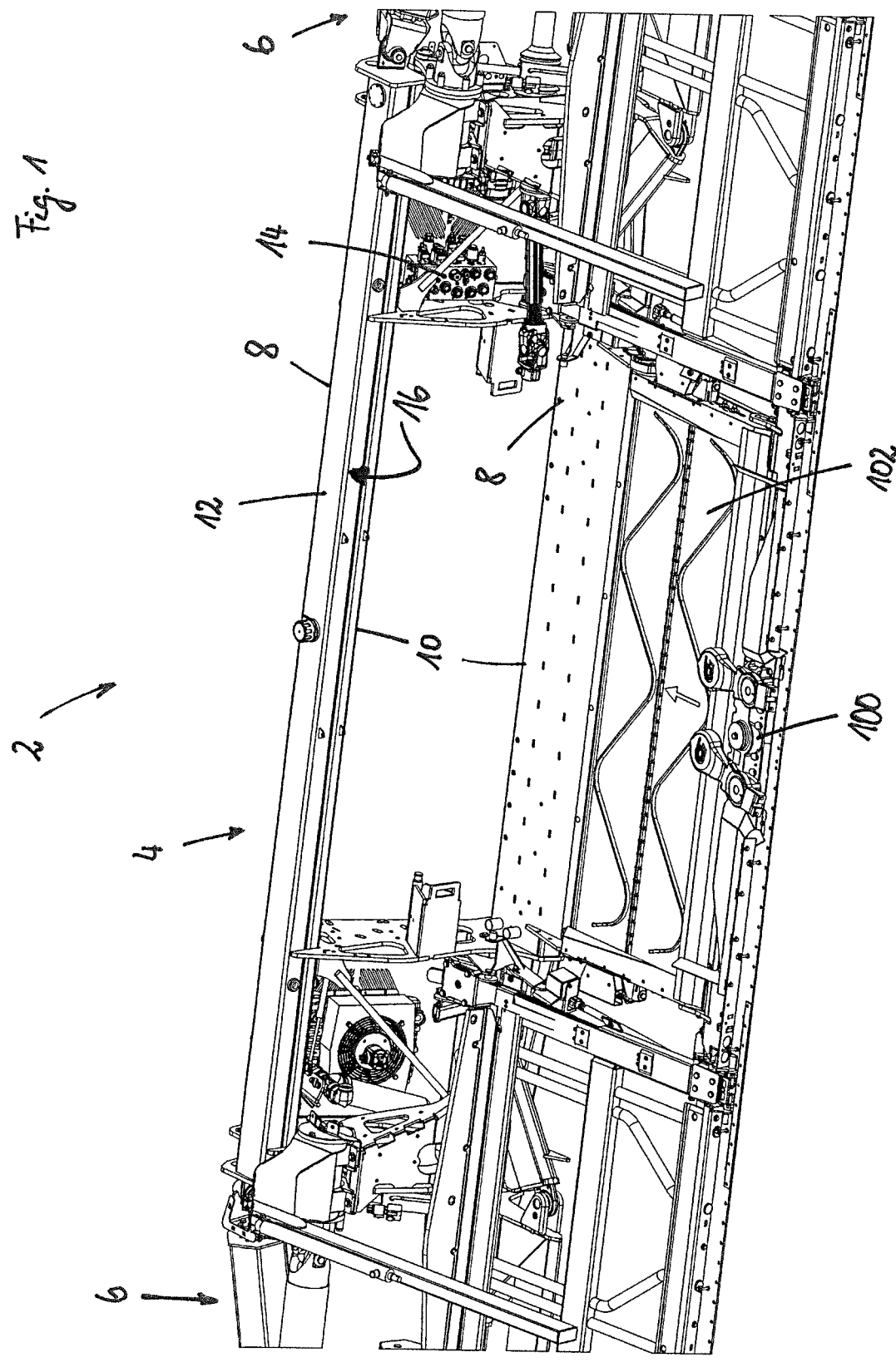
FIG. 1 shows a detail view of a harvesting apparatus.

Referring now to the figures, FIG. 1 shows a detailed view of a harvesting apparatus 2 having a central frame 4 and having an attachment frame 6, which is arranged laterally with respect to and pivotably connected to the central frame 4. As an exemplary embodiment, the invention will be discussed on the basis of a multi-part draper header, by means of which grain crops standing on a field are cut, deposited onto the conveyor belts of the draper header, brought together centrally by means of the conveyor belts, and discharged rearwardly onto the inclined conveyor of a combine harvester. By contrast to the exemplary embodiment, other types of grain headers, as well as corn headers, pick-up apparatuses and the like, may also be used as a harvesting apparatus 2.

The central frame 4, in turn, has a frame 10 that is made up of a plurality of structural elements 8. One of the structural elements 8 is the transverse profile 12, which in the exemplary embodiment is internally hollow. A valve block by means of which hydraulic functions of the harvesting apparatus are controlled is shown, as an example of a hydraulic component 14, on the frame 10.

As an example of a unit 100 for cutting and/or picking up crops, an oil-powered motor is illustrated in the front region of the harvesting apparatus 2, which motor is hydraulically driven and the rotational movement of which motor is transmitted via a transmission to two lever arms illustrated in FIG. 1, by means of which cutter bars which are respectively connected to the lever arms but which are not illustrated in any more detail in the drawing are driven in oscillation. Crops are cut by means of the cutter bars and subsequently fall onto the conveyor belts of the draper header. In order to provide a simplified drawing, the conveyor belts which convey the crops to the center of the harvesting attachment 2, and which are held in the attachment frame 6, are not illustrated; however, as an example of a unit 102 for downstream conveyance of the crops that have been cut and/or picked up, the illustration shows the central conveyor belt by means of which the crops that are deposited thereon are conveyed downstream in the direction of the arrow. The valve block, as an example of hydraulic components 14, serves for controlling and/or for driving the units 100, 102.

The storage tank 16 for storing the liquid required for the operation of the hydraulic components 14 is formed, in the internally hollow structural element 8 of the frame 10, as a fluid-tight storage tank 16 for storing the liquid required for the operation of the hydraulic components 14. The more specific design of the storage tank 16 is illustrated in more detail in the following figures.

Figure 2:
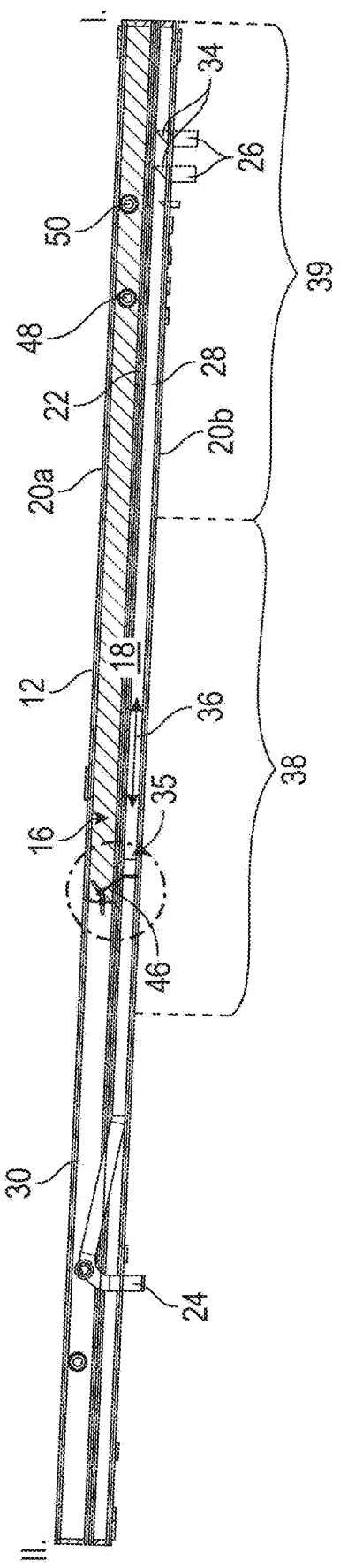
FIG. 2: shows a sectional view of a transverse profile.

FIG. 2 shows a sectional view of a transverse profile 12 as a structural element 8. Formed in the transverse profile 12 is a cavity 18 which forms the storage tank 16 and which has a feed line connection 24 and a suction connection 26. The suction connection 26 opens, via the mouth opening 34, into the suction chamber 28. If the length of the storage tank 16 is divided into thirds in a longitudinal extent direction 36, then the mouth opening 35 of the feed line connection 24 is arranged in the middle third 38, and in the exemplary embodiment also within the suction chamber 28. When the hydraulic pump of the hydraulics system of the harvesting apparatus 2, the hydraulic pump being connected to the suction connection 26, pumps hydraulic oil out of the storage tank 16, then the hydraulic oil is drawn out of the suction chamber 28 via the mouth opening 34 of the suction connection 26. The mouth opening 34 of the suction connection 26 is situated in the outer third 39 of the length of the storage tank 16 in the longitudinal extent direction 36, specifically in the outer region of the length of the storage tank 16 in the longitudinal extent direction 36. For disruption-free operation of the hydraulic system of the harvesting apparatus 2, it is therefore important that there is always sufficient hydraulic oil present at the mouth opening 34 to prevent the hydraulic pump from drawing air in via the mouth opening 34.

In the longitudinal extent, direction 36 that is indicated by a double arrow, the cavity 18 is delimited laterally by two C-shaped profiles 20a, 20b, which, arranged with their open longitudinal sides facing towards one another, are welded together in the region of abutment over their length. Here, the partition 22 is placed between, and welded to, the limbs of the mutually facing C-shaped profiles 20a, 20b. The suction chamber 28 is situated below the partition 22, and the storage chamber 30 is formed above the partition 22. In the illustrated rest position of the harvesting apparatus 2, the partition 22 extends in an at least approximately horizontal plane. In the exemplary embodiment, the partition 22 ends a short distance behind the mouth opening 35 and a short distance in front of the throttle flap 46. The storage chamber 30 is, therefore, taller on that side of the storage tank 16, which is situated opposite the suction chamber 28, than in the region of the suction chamber. The throttle elements 40, 42, with the flow transfer opening 32 situated in between, are situated in the region in which the partition 22 ends in the exemplary embodiment.

Arranged in the storage tank 16 are a snifter valve 48 and a ventilation valve 50 for controlling positive-pressure or negative-pressure situations in the storage tank 16.

FIG. 3 shows an enlarged sectional view of the region marked by the circle in FIG. 2. The sectional view shows the flow transfer opening 32, which has been cut into the partition 22 and by means of which the different parts of the storage chamber 30 are connected to one another. When the spatial position of the harvesting apparatus 2 varies during harvesting work, the liquid situated in the storage tank 16 can flow back and forth through the flow transfer opening 32 between the two parts of the storage chamber 30 that are divided by the throttle element 42, as indicated by the multi-headed arrow.

The respective flow movements of the hydraulic oil between the suction chamber 28 and the storage chamber 30 and within the storage chamber 30 are slowed by a first throttle element 40 and a second throttle element 42. The arrangement of the throttle elements 40, 42 selected in the exemplary embodiment is based on the fact that the mouth opening 34 of the suction connection 26 is arranged so as to be laterally offset with respect to the flow transfer opening 32 in a first direction I with respect to the longitudinal extent direction 36 of the storage tank 16. The first throttle element 40 is arranged in the suction chamber 28 between the mouth opening 34 of the suction connection 26 and the flow transfer opening 32. The first throttle element 40, also, together with the partition 22, separates the suction chamber 28 from the storage chamber 30. The second throttle element 42 is arranged in the storage chamber 30 so as to be laterally offset with respect to the flow transfer opening 32 in a second direction II with respect to the longitudinal extent direction 36 of the storage tank 16. As can be seen from FIGS. 2, 3, and 4, the mouth opening 35 of the feed line connection 24 opens into a region of the suction chamber 28 situated on that side of the first throttle element 40, which faces away from the flow transfer opening 32. Both mouth openings 34, 35 are, therefore, situated on this side of the throttle element 40.

FIG. 4 shows a perspective illustration of the region illustrated in FIG. 3. It can be seen in the perspective view that the first throttle element 40 has, in the lower region, a plurality of passage openings 44 through which hydraulic oil can flow. The area covered by the throttle elements 40, 42 can, owing to the passage openings 44 but also owing to the relatively small overall dimensions of the throttle elements 40, 42, be smaller than the area of the free cross section of the storage tank 16 in the region of the throttle elements 40, 42, such that hydraulic oil can still flow onwards past the throttle elements 40, 42.

As can be seen in FIGS. 3 and 4, a pivotably mounted throttle flap 46 is situated in the region of the flow transfer opening 32 and extends through the flow transfer opening 32. The throttle flap 46 is mounted on a shaft which, in the exemplary embodiment, is held on the second throttle element 42. When hydraulic oil flows through the flow transfer opening 32, the hydraulic oil pushes against the surface of the throttle flap 46. For as long as the throttle flap 46 has not been pushed against a stop 52 and thus blocked in terms of its mobility, the throttle flap 46 can yield, by way of a pivoting movement, to the pressure of the incident flow of hydraulic oil. The throttle flap 46 is thus held so as to be movable by the hydraulic oil that flows through the flow transfer opening 32. In the exemplary embodiment, a stop 52, which acts in the first direction I and which is indicated in FIG. 3, is the first throttle element 40, while the stop 52 that acts in the second direction II is formed by the edge, visible in FIG. 4, of the flow transfer opening 32. Between these two stops 52, the throttle flap 46 is movable so as to follow the flow of the hydraulic oil in both possible flow directions.

The invention is not restricted to the exemplary embodiment discussed above. A person skilled in the art would have no difficulty in modifying the exemplary embodiment in a way that appears suitable to them in order to adapt the exemplary embodiment to a specific usage situation.

From the foregoing, it can be seen that the present invention accomplishes at least all of the stated objectives.

LIST OF REFERENCE CHARACTERS

The following table of reference characters and descriptors are not exhaustive, nor limiting, and include reasonable equivalents. If possible, elements identified by a reference character below and/or those elements which are near ubiquitous within the art can replace or supplement any element identified by another reference character.

TABLE 1

| List of Reference Characters | |
| --- | --- |
| 2 | Harvesting apparatus |
| 4 | Central frame |
| 6 | Attachment frame |
| 8 | Structural element |
| 10 | Frame |
| 12 | Transverse profile |
| 14 | Hydraulic component |
| 16 | Storage tank |
| 18 | Cavity |
| 20a | First C-shaped profile |
| 20b | Second C-shaped profile |
| 22 | Partition |
| 24 | Feed line connection |
| 26 | Suction connection |
| 28 | Suction chamber |
| 30 | Storage chamber |
| 32 | Flow transfer opening |
| 34 | Mouth opening, suction connection |
| 35 | Mouth opening, feed line connection |
| 36 | Longitudinal extent direction |
| 38 | Middle third |
| 39 | Outer third |
| 40 | First throttle element |
| 42 | Second throttle element |
| 44 | Passage opening |
| 46 | Throttle flap |
| 48 | Snifter valve |
| 50 | Ventilation valve |
| 52 | Stop |
| 100 | Cutting unit |
| 102 | Downstream conveying unit |
| I | First direction |
| II | Second direction |

GLOSSARY

Unless defined otherwise, all technical and scientific terms used above have the same meaning as commonly understood by one of ordinary skill in the art to which embodiments of the present invention pertain.

The terms "a," "an," and "the" include both singular and plural referents.

The term "or" is synonymous with "and/or" and means any one member or combination of members of a particular list.

The terms "invention" or "present invention" are not intended to refer to any single embodiment of the particular invention but encompass all possible embodiments as described in the specification and the claims.

The term "about" as used herein refers to slight variations in numerical quantities with respect to any quantifiable variable. Inadvertent error can occur, for example, through the use of typical measuring techniques or equipment or from differences in the manufacture, source, or purity of components.

The term "substantially" refers to a great or significant extent. "Substantially" can thus refer to a plurality, majority, and/or a supermajority of the quantifiable variable, given proper context.

The term "generally" encompasses both "about" and "substantially."

The term "configured" describes structure capable of performing a task or adopting a particular configuration. The term "configured" can be used interchangeably with other similar phrases, such as constructed, arranged, adapted, manufactured, and the like.

Terms characterizing sequential order, a position, and/or an orientation are not limiting and are only referenced according to the views presented.

The "scope" of the present invention is defined by the appended claims, along with the full scope of equivalents to which such claims are entitled. The scope of the invention is further qualified as including any possible modification to any of the aspects and/or embodiments disclosed herein which would result in other embodiments, combinations, subcombinations, or the like that would be obvious to those skilled in the art.

What is claimed is:

1. A harvesting apparatus (2) comprising of: a frame (10) made up of a plurality of structural elements (8), at least one of which is internally hollow, having units (100) for cutting and/or picking up crops, having units (102) for conveying the cut and/or picked-up crops downstream, having hydraulic components (14) for controlling and/or for driving the aforementioned units (100, 102), and having a storage tank (16) for storing the liquid required for the operation of the hydraulic components (14), wherein the storage tank (16) is formed, in the internally hollow structural element (8) of the frame (10), as a fluid-tight storage tank (16) for storing the liquid required for the operation of the hydraulic components (14), wherein a cavity (18) formed in the structural element (8) has a feed line connection (24) and a suction connection (26), wherein the storage tank (16) is divided, by a partition (22) that extends in an at least approximately horizontal plane in a longitudinal extent direction (36) when the harvesting apparatus (2) is in a rest position, into a suction chamber (28) situated below the partition (22) and a storage chamber (30) situated above the partition (22), and the suction connection (26) opens, via a mouth opening (34) assigned thereto, into the suction chamber (28).

2. The harvesting apparatus (2) according to claim 1, wherein the at least one structural element (8) is a transverse profile (12) of the frame (10).

3. The harvesting apparatus (2) according to claim 1, wherein the storage tank (16) is divided into thirds in the longitudinal extent direction (36), a mouth opening (35) of the feed line connection (24) is arranged in the middle third (38).

4. The harvesting apparatus according to claim 1, wherein the mouth opening (34) of the suction connection (26) is situated in the outer third (39) of the length of the storage tank (16) in the longitudinal extent direction (36).

5. The harvesting apparatus (2) according to claim 1, wherein the storage chamber (30), there is arranged a throttle element (42) which throttles the exchange of hydraulic oil within a storage the storage chamber (30) and to which there is assigned an adjacent flow transfer opening (32) through which hydraulic oil situated in parts of the storage chamber (30) that are separated from one another by the throttle element (42) can flow when the harvesting apparatus is situated in an oblique pivoted position.

6. A harvesting apparatus (2) comprising of: a frame (10) made up of a plurality of structural elements (8), at least one of which is internally hollow, having units (100) for cutting and/or picking up crops, having units (102) for conveying the cut and/or picked-up crops downstream, having hydraulic components (14) for controlling and/or for driving the aforementioned units (100, 102), and having a storage tank (16) for storing the liquid required for the operation of the hydraulic components (14), wherein the storage tank (16) is formed, in the internally hollow structural element (8) of the frame (10), as a fluid-tight storage tank (16) for storing the liquid required for the operation of the hydraulic components (14), wherein a cavity (18) formed in the structural element (8) has a feed line connection (24) and a suction connection (26) and the at least one structural element (8) is a transverse profile (12) of a frame (10), wherein the storage tank (16) is divided, by a partition (22) that extends in an at least approximately horizontal plane when the harvesting apparatus (2) is in a rest position, into a suction chamber (28) situated below the partition (22) and a storage chamber (30) situated above the partition (22), and the suction connection (26) opens, via a mouth opening (34) assigned thereto, into the suction chamber (28), wherein the mouth opening (34) of the suction connection (26) is arranged so as to be laterally offset with respect to a flow transfer opening (32) in a first direction (I) with respect to a longitudinal extent direction (36) of the storage tank (16), a first throttle element (40) is arranged in the suction chamber (28) between the mouth opening (34) of the suction connection (26) and the flow transfer opening (32) and separates the suction chamber (28) from the storage chamber (30), and a second throttle element (42) that divides the storage chamber (30) is arranged in the storage chamber (30) so as to be laterally offset with respect to the flow transfer opening (32) in a second direction (II) with respect to the longitudinal extent direction (36) of the storage tank (16).

7. The harvesting apparatus (2) according to claim 6, wherein the first and/or second throttle element (40, 42) has one or more passage openings (44) in a lower region of the first and/or second throttle element (40/42).

8. The harvesting apparatus (2) according to claim 5, wherein the flow transfer opening (32), includes a pivotably mounted throttle flap (46) that extends through the flow transfer opening (32) and which is held so as to be movable by the hydraulic oil that flows through the flow transfer opening (32).

9. The harvesting apparatus (2) according to claim 8, wherein the pivotability of the throttle flap (46) is limited in at least one pivoting direction by a stop (52).

10. The harvesting apparatus (2) according to claim 8, wherein the movable throttle flap (46) throttles the hydraulic oil in both possible flow directions.

11. The harvesting apparatus (2), according to claim 1, wherein the storage tank (16) is connected to a snifter valve (48) that allows air to flow into the storage tank (16) if the pressure prevailing in the storage tank (16) undershoots a threshold value.

12. The harvesting apparatus (2) according to claim 1, wherein the storage tank (16) is connected to a ventilation valve (50) that opens if the pressure prevailing in the storage tank (16) overshoots a threshold value.

13. The harvesting apparatus (2) according to claim 1, wherein the plurality of structural elements (8) of the frame (10) has, over its extent in the longitudinal extent direction (36) of the fluid-tight storage tank (16), two C-shaped profiles (20) which delimit the storage tank (16) in the longitudinal extent direction (36) and which, arranged with their open longitudinal sides facing towards one another, are welded together in the region of abutment over their length, wherein the partition (22) is placed between, and welded to, the limbs of the mutually facing C-shaped profiles (20).

14. The harvesting apparatus (2) according to claim 1, wherein the harvesting apparatus (2) is a multi-part machine having at least one central frame (4) and having two attachment frames (6) arranged laterally with respect to and pivotably connected to the central frame (4), wherein the structural element (8) is a central transverse profile (12) of the central frame (4).

* * * * *